(12) United States Patent
Liu et al.

(10) Patent No.: US 6,944,296 B1
(45) Date of Patent: Sep. 13, 2005

(54) VIDEO BIT SCRAMBLING

(75) Inventors: Robert G. Liu, Sunnyvale, CA (US); Boon-Lock Yeo, Sunnyvale, CA (US); Minerva Ming-Yee Yeung, Sunnyvale, CA (US); Dmitriy Tesler, Foster City, CA (US); Subrahmanyam Ramachandran, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,911

(22) Filed: Mar. 24, 1999

(51) Int. Cl.[7] ............................................. H04N 7/167
(52) U.S. Cl. ........................................ 380/201; 705/56
(58) Field of Search ............................ 380/201; 705/56

(56) References Cited

U.S. PATENT DOCUMENTS

| | | | |
|---|---|---|---|
| 4,229,818 A | * | 10/1980 | Matyas et al. ................. 380/37 |
| 5,091,942 A | * | 2/1992 | Dent ............................. 380/44 |
| 5,185,794 A | * | 2/1993 | Thompson et al. .......... 380/235 |
| 5,224,166 A | * | 6/1993 | Hartman, Jr. ................ 380/277 |
| 5,546,461 A | * | 8/1996 | Ibaraki et al. ............... 380/217 |
| 5,892,825 A | | 4/1999 | Mages et al. |
| 6,173,402 B1 | * | 1/2001 | Chapman ..................... 713/182 |

FOREIGN PATENT DOCUMENTS

GB      2316278 A    *   2/1998      ............. H04L 9/18

OTHER PUBLICATIONS

Langelaar, G.C., "Overview of protection methods in existing TV and storage devices", Technical University of Delft, Feb. 26, 1996, chapter 2, (www.elektronica.coolbegin.com/g.asp?id=3889).*

Wool, Avishai, "Key Management for Encrypted Broadcast", ACM, 2000, Lucent Technologies, entire document.*

Cheng, Jieylin, et al, "STREAMTO: Streaming Content Using a Tamper-Resistant Token", Univ. of Twente, 2003, entire document, www.ub.utwente.nl/webdocs/ctit/1/0000011c.pdf.*

B. Schneier, Applied Cryptography, (1996 2nd Ed), John Wiley & Sons, Inc., pp. 189-211.

S. Beatty, "Intel, Ad Age to Sell Peeks at New Spots," The Wall Street Journal, Oct. 7, 1998, p. B6.

C. Shi et al. "A Fast MPEG Video Encryption Algorithm," ACM Multimedia '98 Bristol, UK, ACM 1-58113-036-8/98/0008.

* cited by examiner

*Primary Examiner*—Ayaz Sheikh
*Assistant Examiner*—Ronald Baum
(74) *Attorney, Agent, or Firm*—Sharon Wong

(57) ABSTRACT

In some embodiments, the invention includes a method to bit scramble a digital video signal. The method includes receiving blocks of the digital video signal and scrambling the blocks of the digital video signal responsive to a remote computer number. The remote computer number may be a processor number of a remote computer that may descramble the bit scrambled video signal. In other embodiments, the invention includes a method to descramble a bit scrambled video signal in a computer. The method includes receiving blocks of the bit scrambled video signal and descrambling the blocks of the bit scrambled video signal responsive to a remote computer number of the computer in which the descrambling is occurring. Additional embodiments are described and claimed.

18 Claims, 4 Drawing Sheets

| DIGITAL VIDEO (V) OPERAND | V0 | V1 | V2 |
|---|---|---|---|
| | PK | PK | PK |
| RESULT1 (R1) | V0 XOR PK | V1 XOR PK | V2 XOR PK |

| RESULT1 (R1) | V0 XOR PK | V1 XOR PK | V2 XOR PK |
|---|---|---|---|
| BYTE NO. (BN) | BYTE X | BYTE X+1N | BYTE X+2N |
| SCRAMBLED (SV) | SV0 | SV1 | SV2 |

| SV OPERAND | SV0 | SV1 | SV2 |
|---|---|---|---|
| | PK | PK | PK |
| RESULT1 (R1) | SV0 XOR PK | SV1 XOR PK | SV2 XOR PK |

| RESULT1 (R1) | SV0 XOR PK | SV1 XOR PK | SV2 XOR PK |
|---|---|---|---|
| BYTE NO. (BN) | BYTE X | BYTE X + N | BYTE X + 2N |
| DV | DV0 | DV1 | DV2 |

VIDEO BIT SCRAMBLING

BACKGROUND OF THE INVENTION

1. Technical Field of the Invention

The invention relates to techniques for scrambling bits of digital video signals and for descrambling the bits in a remote computer if certain conditions are met.

2. Background Art

With the advent of digital media and the increasingly widespread use of the Internet, cable, and satellite transmissions, the amount of video content creation is dramatically increasing. Content may be created for commercial purposes such as entertainment and advertising, or for more personal interests such as home videos and information for the hobbyist.

The term "streaming video" is often used to refer to point to point transmission of video, as opposed to broadcast video, wherein one computer sends the same signal to more than one receiving computer. Streaming video is often transmitted in real time. The term "video on demand" refers to the ability to request specific video content among various choices and have it provided as in streaming video.

For many content providers, there is a concern that sensitive or economically valuable content be provided to only specific individuals. Passwords and encryption have been used in an attempt to assure this. For example, an Internet provider may require a password before content is sent and/or the Internet provider may encrypt the content and expect the receiver to decrypt the content.

There are various formats for digital video. Common formats for digital video include MPEG (Moving Picture Experts Group) formats. Current and proposed MPEG formats include MPEG-1 ("Coding of Moving Pictures and Associated Audio for Digital Storage Media at up to about 1.5 MBits/s," International Standard IS-11172, completed in 10.92), MPEG-2 ("Generic Coding of Moving Pictures and Associated Audio" Committee Draft CD 13818 as found in documents MPEG93/N601, N602, N603 (11.93)); and MPEG-4 ("Very Low Bitrate Audio-Visual Coding" Status: call for Proposals 11.94, Working Draft in 11.96). There are different versions of MPEG-1 and MPEG-2.

SUMMARY

In some embodiments, the invention includes a method to bit scramble a digital video signal. The method includes receiving blocks of the digital video signal and scrambling the blocks of the digital video signal responsive to a remote computer number. The remote computer number may be a processor number of a remote computer that may descramble the bit scrambled video signal.

In other embodiments, the invention includes a method to descramble a bit scrambled video signal in a computer. The method includes receiving blocks of the bit scrambled video signal and descrambling the blocks of the bit scrambled video signal responsive to a remote computer number of the computer in which the descrambling is occurring.

Additional embodiments are described and claimed.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The invention concerns techniques to scramble bits of digital video signals and descramble the bits in a remote computer if certain conditions are met. In some embodiments, the bits are scrambled block by block and later descrambled block by block allowing high speed on the fly scrambling and descrambling. The invention may be used for streaming video, broadcast video, and non-real time encryption and decryption of video signals, whether point to point or broadcast. The invention may be used in connection with video on demand. As used herein, a block is not restricted to any particular portion of a digital video signal and may be a fixed bit-length signal (e.g., it is not necessarily an MPEG block or MPEG macroblock and should not be confused with these MPEG terms). Audio that may accompany the video may also be scrambled and descrambled.

Reference in the specification to "some embodiments" or "other embodiments" means that a particular feature, structure, or characteristic described in connection with the embodiments is included in at least some embodiments, but not necessarily all embodiments, of the invention. The various appearances of the term "some embodiments" in the description are not necessarily all referring to the same embodiments.

Figure 1:
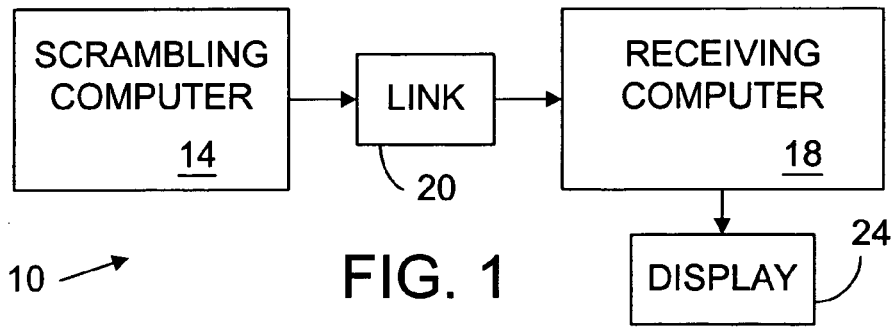
FIG. 1 is a block diagram representation of a system including a scrambling computer, link, and receiving computer according to some embodiments of the invention.

Referring to FIG. 1, a system 10 includes a bit scrambling computer 14 that provides a bit scrambled video signal through a link 20 to a remote receiving computer 18.

Receiving computer 18 drives a display 24, which may be physically packaged or separate from receiving computer 18. A key, described below, is used to scramble the video. If receiving computer 18 uses the same key and includes proper hardware and/or software, the scrambled video is descrambled by receiving computer 18 for display on display 24. (In the described embodiments, the scrambling and descrambling process is lossless, but in other embodiments it could be lossy.) If receiving computer 18 does not have the correct key and/or does not include proper hardware and/or software, either nothing or unrecognizable video is displayed on display 24 in response to the scrambled video. A reason why nothing might be displayed is that many media players skip over bits that do not conform to a particular format (e.g., one of the MPEG formats). Link 20 represents any of various links including the Internet, an intranet, a local area network, cable, satellite, or other networks, or a combination of them.

In some embodiments, the key includes more than one component. In some embodiments, the key includes a remote computer number. The remote computer number is a number associated with remote receiving computer 18. Examples of remote computer number include a processor number (PN) associated with a particular processor, a chipset number associated with a particular chipset, and a software number that is associated with particular software, such as an operating system, or a combination of them. The remote computer number can be obtained in various ways (e.g., through a secure socket layer applet sent to the remote receiving computer). The user of the remote receiving computer could request software that is downloaded from scrambling computer 14 or elsewhere. Upon receiving the correct password, the software interfaces with scrambling computer 14 to provide the remote computer number of the remote receiving computer. Using the remote computer number as a component in the key adds an extra level of security.

As used herein, the term computer is intended to be broadly interpreted to include a variety of systems and devices including general purpose computers such as personal computers, portable computers, and mainframe computers, and specific purpose computers, such as set top boxes, digital versatile disc (DVD) players, and the like.

Figure 2:
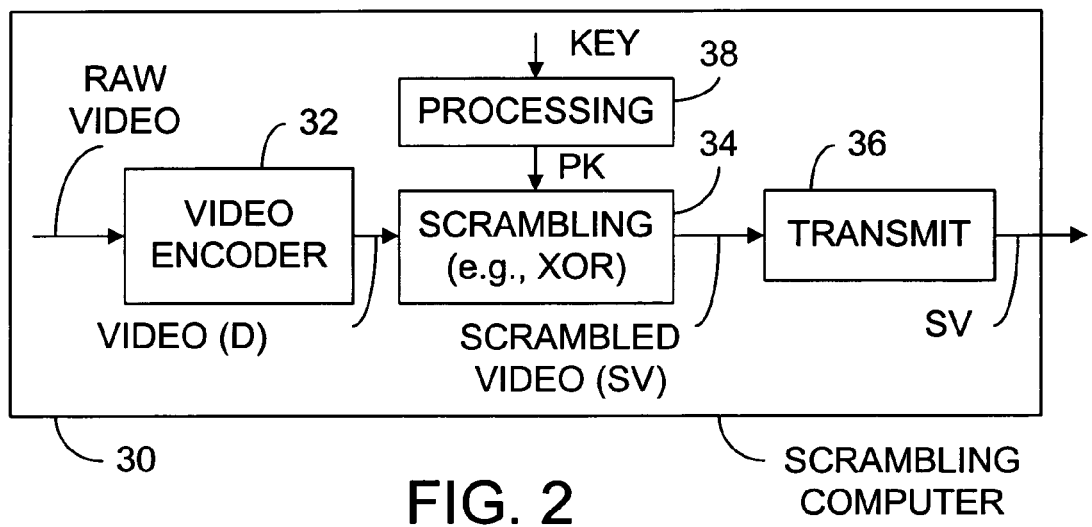
FIG. 2 is a block diagram representation of the scrambling computer of FIG. 1 according to some embodiments of the invention.

Referring to FIG. 2, scrambling computer 30 is an example of scrambling computer 14.

Raw video is received by a video encoder 32 to produce a compressed digital video signal in a particular format (e.g., one of the MPEG formats). The digital video signal is received by a scrambling mechanism 34. (As used herein, the term "mechanism" refers to a structure that may include dedicated hardware, or software or firmware executed by a processor, such as a microprocessor or digital signal processor, or a combination of them.) Alternatively, the video signal may be received by scrambling computer 30 in an already compressed format so that video encoder 32 might not be used in some cases.

Processing mechanism 38 receives a key and provides a processed key (PK) to scrambling mechanism 34. Scrambling mechanism 34 performs a bit scrambling technique to produce a bit scrambled video signal (SV). Examples of bit scrambling techniques are described below. The bit scrambled video signal is a function of at least the video signal and the processed key. In some embodiments, a video position signal is used in scrambling mechanism 34 (e.g., see FIGS. 11 and 12). The bit scrambled video signal may be received by a transmitting mechanism 36 for transmitting to remote receiving computer 18. The bit scrambling video signal may be held in a buffer or other memory and perhaps otherwise processed in scrambling computer 30 and/or link 20.

Figure 3:
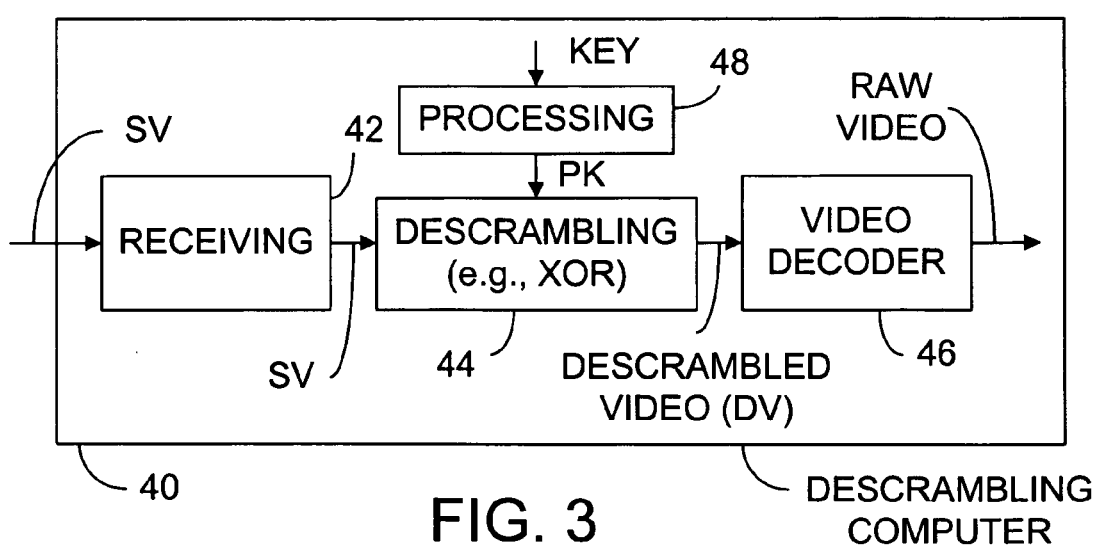
FIG. 3 is a block diagram representation of a descrambling computer, which is an example of the remote receiving computer of FIG. 1 according to some embodiments of the invention.

Referring to FIG. 3, descrambling computer 40 is an example of a remote receiving computer 18. The bit scrambled video signal from the scrambling computer 30 is received by receiving mechanism 42 through link 20. Note that if the bit scrambled video signal is further altered through processing in scrambling computer 30 or link 20, that altering will be undone at some point and the mechanism for the altering and undoing of the altering is not discussed herein.

Descrambling mechanism 44 receives the bit scrambled video signal from receiving mechanism 42. Processing mechanism 48 receives a key and provides a processed key (PK) to scrambling mechanism 44. In some embodiments, for there to be descrambling, processing mechanism 48 is identical to processing mechanism 38 and the key and processed key in descrambling computer 40 are identical to the key and processed key in scrambling computer 30. That is, in these embodiments, if the key is different in the receiving computer than it was in the scrambling computer, the bit scrambled video signal will not be descrambled. If the conditions are met, descrambling mechanism 44 undoes the bit scrambling to produce a descrambled digital video signal (DV). A video decoder mechanism 46 may decompress the descrambled video for displaying on display 24.

Note that it is not necessary that scrambling mechanism 34 and descrambling mechanism 44 act on compressed video. However, the speed at which the video signal may be transferred over link 20 will be increased if the video signal is compressed.

Figure 4:
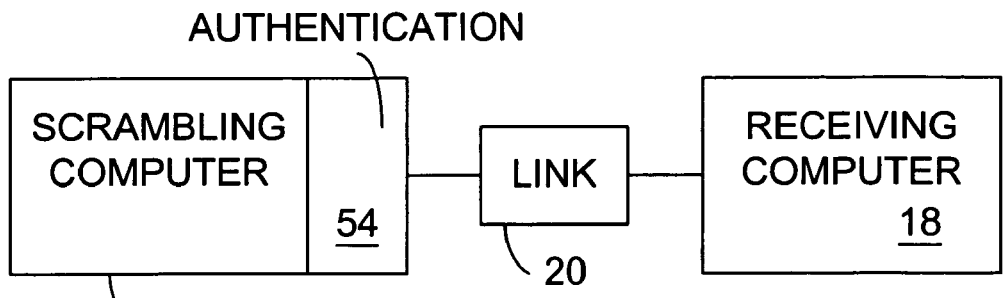
FIG. 4 is a block diagram representation of a system including a scrambling computer having an authentication mechanism, link, and receiving computer, according to some embodiments of the invention.

In some embodiments, the scrambling computer includes an authentication mechanism to determine whether the remote receiving computer has the correct key or portion of the correct key. For example, referring to FIG. 4, a scrambling computer 52 (which is an example of scrambling computer 14) includes an authentication mechanism 54 which may be used to determine whether remote receiving computer 18 has the correct key (in some embodiments) or a portion of the correct key (in other embodiments). For example, authentication unit 54 may check to determine whether remote receiving computer 18 has the proper remote computer number. In that example, if remote receiving computer 18 does not have the proper remote computer number, scrambling computer 52 would not send the video signal to remote receiving computer 18 or discontinue sending the scrambled signal if it has already started. This mode of protection ensures that the playback occurs only during a network connection and to the right remote receiving computer. The check for remote computer number may be made periodically.

Figure 5:
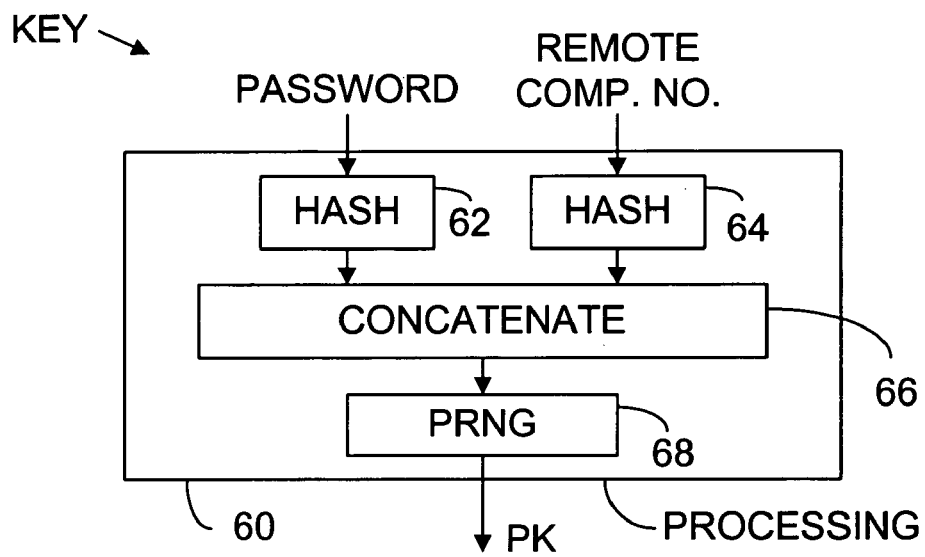
FIG. 5 is a block diagram representation of the processing mechanisms of FIGS. 2 and 3 according to some embodiments of the invention.

In different embodiments, the key includes different components. Also, in different embodiments, the details of processing mechanisms 38 and 48 may be different. For example, referring to FIG. 5, a processing mechanism 60 is an example of processing mechanism 38 and/or 48. The key includes a password and a remote computer number, which are hashed by hash mechanisms 62 and 64. The hashed password and remote computer number are concatenated by concatenation mechanism 66 to seed a pseudorandom number generator (PRNG) 68. PRNG creates the processed key PK. Alternatively, the password and remote computer number could be concatenated first (which may include some truncation) and then hashed. Once a PRNG is seeded, it can continue to provide pseudo random numbers without being reseeded. In some embodiments, it there is not both hashes and a PRNG in the same processing mechanism.

Figure 6:
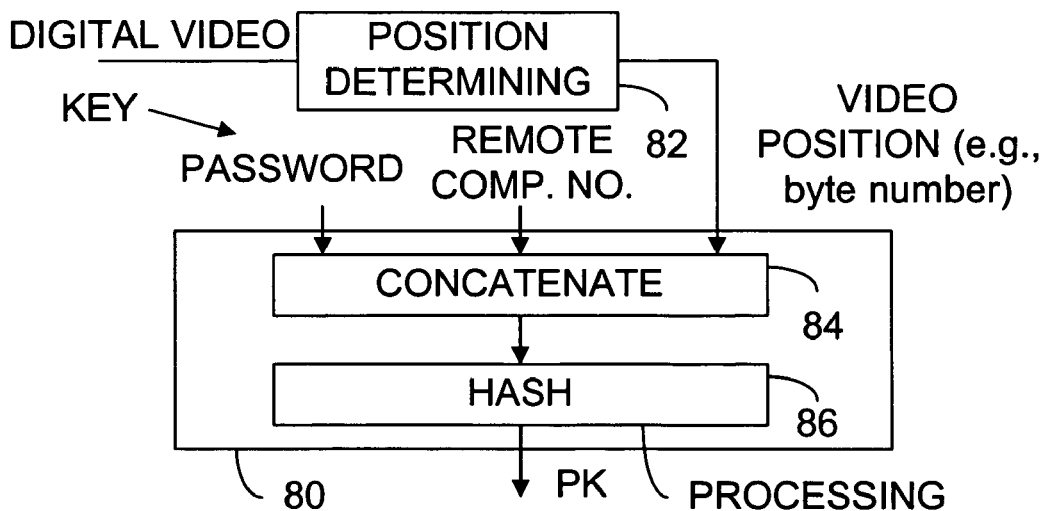
FIG. 6 is a block diagram representation of the processing mechanisms of FIGS. 2 and 3 according to some embodiments of the invention.

As another example, referring to FIG. 6, a processing mechanism 80 is another example of processing mechanism 38 and/or 48. A position determining mechanism 82 receives the digital video signal (V) and produces a video position number signal. The video position number signal is indicative of the block being scrambled or descrambled. For example, the video position number could be a number representing the block or the first byte in the block. The key includes a password, a remote computer number, and the video position number signal, which are concatenated in concatenation mechanism 84 and hashed in hash mechanism 86, which produces PK. Processing mechanism 80 could have included a PRNG. Similarly, processing mechanism 60 may alternatively not include PRNG 68. Processing mechanisms 38 and 48 may include other details. Processing mechanisms 38 and 48 might merely concatenate components or otherwise process the key to produce the PK. The PK may be held in a buffer (not illustrated) and supplied to scrambling or descrambling mechanisms 34 or 44 from the buffer.

Figure 7:
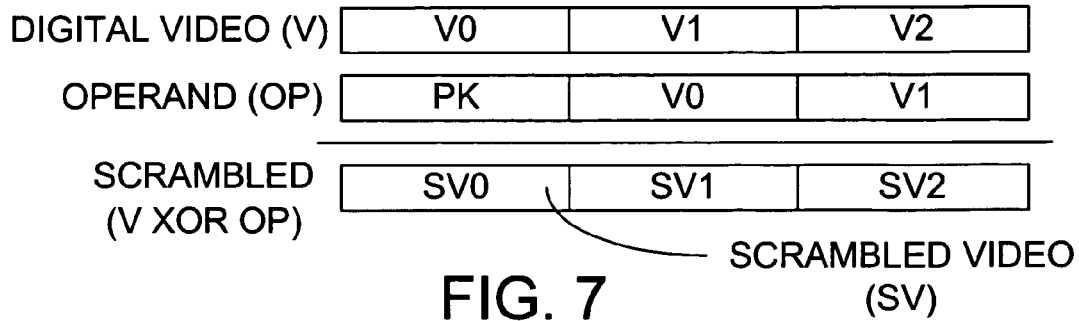
FIG. 7 illustrated scrambling using exclusive-OR (XOR) operations according to some embodiments of the invention.
Figure 8:
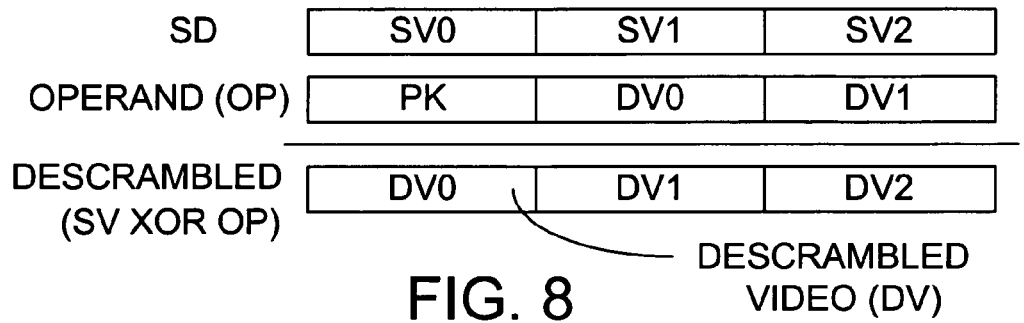
FIG. 8 illustrated descrambling using XOR operations according to some embodiments of the invention.
Figure 9:
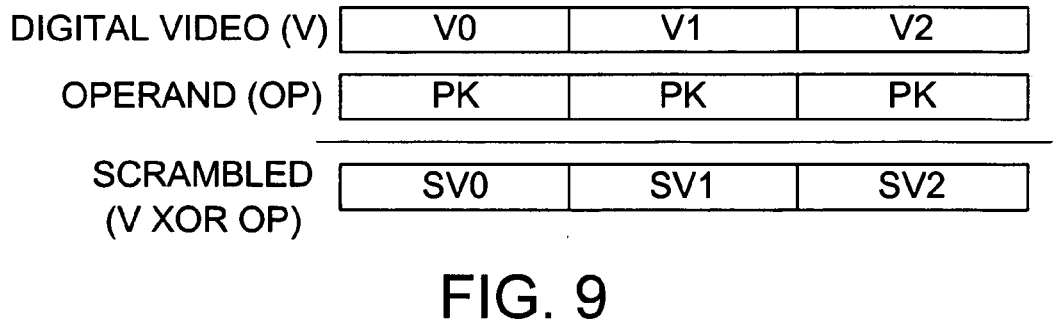
FIG. 9 illustrated scrambling using XOR operations according to some embodiments of the invention.
Figure 10:
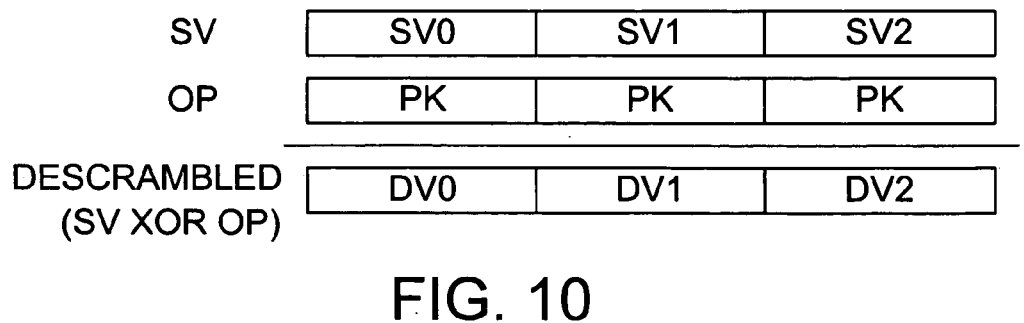
FIG. 10 illustrated descrambling using XOR operations according to some embodiments of the invention.
Figures 11, 12, 13:
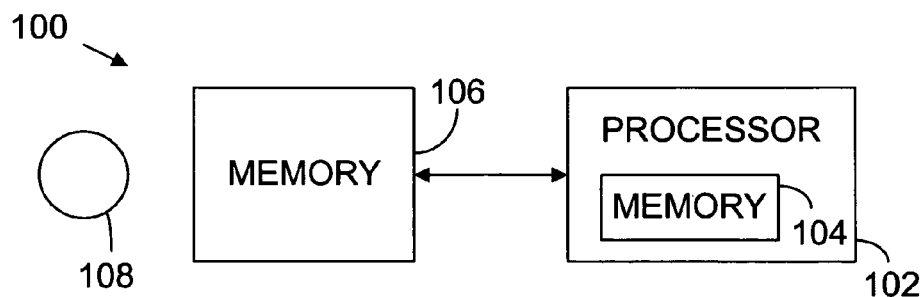
FIG. 11 illustrated scrambling using XOR operations according to some embodiments of the invention.
FIG. 12 illustrated descrambling using XOR operations according to some embodiments of the invention.
FIG. 13 is a block diagram representation of certain components of the computers of FIG. 1 according to some embodiments of the invention.

In some embodiments, scrambling and descrambling mechanisms 34 and 44 perform at least one level of XOR operations, although they may also perform other functions. In different embodiments, the scrambling and descrambling procedures are different. For example, FIGS. 7 and 8 illustrate a first scrambling and descrambling procedure; FIGS. 9 and 10 illustrate a second scrambling and descrambling procedure; and FIGS. 11 and 12 illustrate a third scrambling and descrambling procedure.

Referring to FIG. 7, V0, V1, and V2 are three successive blocks in the digital video signal (V) received by scrambling mechanism 34. SV0, SV1, and SV2 are three successive blocks in the bit scrambled video signal produced by scrambling mechanism 34. As noted, a block is not restricted to any particular portion of the digital video signal and may be a fixed bit-length signal (e.g., 32 bits per block). An XOR operation is performed with a block V0 and the processed key (PK) to produce a block SV0 of the scrambled digital video signal (SV). As is well known, in an XOR operation, 0 XOR 0=0, 0 XOR 1=1, 1 XOR 0=1, 1 XOR 1=0. (In some embodiments, the first bit of the V0 is XORed with the first bit of PK, second bit of V0 is XORed with the second bit of PK, etc., although a different order could be used as long as it is also followed in descrambling mechanism 44.) In the illustrated embodiment, an XOR operation is also performed between V1 and V0 to produce SV 1 of the bit scrambled video signal. An XOR operation is also performed between V2 and V1 to produce SV2. The XORing of V0 and PK and the XORing of V1 and V0 may be performed sequentially, concurrently, or be partially overlapping.

Referring to FIG. 8, descrambling mechanism 44 undoes the scrambling that produced scrambled blocks SV0, SV1, and SV2 to produce descrambled video signal blocks DV0, DV1, and DV2, which may be identical to V0, V1, and V2. In XOR mechanism 68, SV0 is XORed with PK to produce DV0, SV1 is XORed with DV0 to produce DV1, and SV2 is XORed with DV1 to produced DV2, etc.

In other embodiments, as illustrated in FIG. 9, scrambling mechanism 34 performs similar to that in FIG. 7 except that V0, V1, and V2 are each XORed with PK to produced SV0, SV1, and SV2, respectively. Likewise as illustrated in FIG. 10, descrambling mechanism 44 performs similar to that of FIG. 8, except that SV0, SV1, and SV2 are XORed with PK to produced DV0, DV1, and DV2, respectively. Note that PK may change over time (e.g., see FIG. 6).

In the examples of FIGS. 7–10, there is only one level of XOR operations. In other embodiments, there may be more than one level. In the example of FIG. 11, scrambling mechanism 34 first performs V0 XOR PK (having a result called result RI) and performs XOR with R1 and a byte number X (BN) of the digital video signal (V) to produce SV1, where SV1= R1 XOR BN. For example, the byte number may indicate a number for the first byte of the block being XORed. Alternatively, the block number could be used as an XOR operand. Position determining mechanism 82 may be used to generate the video positioning number (e.g., byte number or block number.) Likewise, V1 is XORed with PK and the result is XORed with Byte X+1N; and V2 is XORed with PK and the result is XORed with Byte X+2N, etc., where N may be 1 or some other value. Note that the particular byte number does not matter as long as the same is used in descrambling. FIG. 12 illustrates possible operations for descrambling mechanism 44. For example, SV1 is XORed with PK to produce result R1, then R1 is XORed with Byte X to produce descrambled video signal DV0, which may be identical to V0. Likewise, DV1 and DV2 are produced through XORing R1 and BN.

Various other XORing procedures could be used, including different orders of XORs. Further, although in FIGS. 11 and 12, the PK operand is used in each XORing in the first level of XORing, the PK could merely be an initialization vector and each following XORing could use the previous D or SV signal has in the example of FIGS. 7 and 8.

FIG. 13 illustrates some components of a computer 100, which is an example of computers 14 and 18 in FIG. 1, although they are not so limited. Computer 100 includes a processor 102 having on die memory 104, and off die memory 106. Memory 106 represents various types of memory including RAM and a hard drive. A disc 108 may contain software to perform the techniques described herein. Each of these memories and the disc include machine readable medium to hold the instructions to be executed.

In the systems of FIGS. 1–3, standard off-the-shelf video encoders and decoders may be used. There encoders and decoders may support non-standard input/output (I/O). Examples of standard off-the-shelf decoders include video decoders that conform to the Microsoft® MCI (Media Control Interfaces) interfaces. Through the MCI interfaces, the I/O routines for reading a block of data and seeking an arbitrary position in a video can be replaced by user-supplied ones. In this invention, the user-supplied routines for performing I/O may also be used to perform the bit descrambling process. As data bits are read in the memory of a computer system, the bits are descrambled on the fly. As a result, the unprotected original version of the digital video will not be sitting on the file system. Instead, only a small chunk of the original video data will be in memory at a time. This makes complete recovery difficult, if not impossible. Another example of an off-the-shelf decoder is one that conforms to the Microsoft® DirectShow™ interfaces and the comments made with respect to the MCI apply.

These two off-the-shelf video decoder solutions allows the scrambling and descrambling of video compressed with any compression methods supported by the decoder. Through using either MCI or DirectShow™, some embodiments of the invention may be used in connection with most video compression methods, including Microsoft® AVI, MPEG, Apple® QuickTime™ and DV (Sony® digital video format).

For a custom developed video decoding system, the descrambling mechanism can be integrated with the I/O process of the system. During the read process, in some embodiments, a block of data will be read at a time. Each block of data will be first processed by the descrambling mechanism, before that block is being processed by the decoding unit.

In some embodiments, every block is scrambled. In other embodiments, not every block is scrambled. For example, every fourth block might be scrambled. Header information might not be scrambled.

There are several possibilities as to how the fact that a block of video has been scrambled can be transmitted or conveyed to the media player. The following are some ways.

1. Inserted into a header information with the protected video. For MPEG video, the header can be the user data section of the bitstream. The user data section is used specifically for storing any user information and will be ignored by a standard MPEG decoder. A modified MPEG decoder will read the user data section to extract the segment information. In a streaming environment where random access is supported (i.e., video need not be transmitted in full; rather only a small segment of video might be transmitted at a time), this segment information may be inserted with the user data section of the segment that is being streamed.

2. Embedded into the video frames using invisible watermarking techniques. Invisible watermarking techniques are methods for inserting information into media data without creating visible distortion. The media player first extracts the watermark and thus the information regarding protected segment, before actual playback of the video. In a streaming environment where random access is supported, the segment information may be inserted using invisible watermarking techniques to the start of the segment that is being streamed (instead of placing it at the start of the video). In such a case, the video server may be capable of live insertion of the watermark as the video is being streamed to the client.

3. Sending the information as separate data. This case is useful for online purchase of movie in which unprotected video segments are used as teasers to entice the user to pay for the full movie. Without the protected segment information, the media player cannot play back the protected segment in its original forms. In this example, the segment information may be sent only when payment is made and authorization is given.

Additional Information and Embodiments

It is simplest to make scrambling and descrambling mechanisms 34 and 44 the same. However, that is not required. It is possible to construct a system wherein processing mechanisms 38 and 48 are designed to be different but still give the same PK because different keys are intentionally entered. It is also possible to construct a system wherein the scrambling and descrambling mechanism are different but the descrambling mechanism correctly descrambles, because for example, a different PK is used.

There could be multiple levels of scrambling in series using different keys components.

The key may include a component representing information from previous blocks.

The term "responsive" and related terms mean that one signal or event is influenced to some extent by another signal or event, but not necessarily completely or directly. If the specification states a component, event, or characteristic "may", "might" or "could" be included, that particular component, event, or characteristic is not required to be included.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method to bit scramble a digital video signal, comprising:
   receiving blocks of the digital video signal;
   scrambling the blocks of the digital video signal responsive to a key of which
     a remote computer number and
     a video position number are components, the video position number representing positional information including the block to be scrambled, wherein the scrambling includes XOR operations between
     the blocks of the digital video signal to be scrambled and
     other operands, with each XOR operation being between
       one of the blocks to be scrambled and
       one of the other operands,
     wherein the other operands are each the key.

2. The method of claim 1, wherein for a first block to be scrambled, the other operand is the key, and for subsequent blocks to be scrambled, the other operands are blocks of the digital video signal preceding the block to be scrambled.

3. The method of claim 2, wherein the preceding blocks are immediately preceding blocks with respect to block to be scrambled.

4. The method of claim 1, wherein the remote computer number is a processor number.

5. The method of claim 1, wherein the scrambling includes XOR operations and wherein the video position numbers are operands to some of the XOR operations.

6. The method of claim 1, further comprising authenticating a remote receiving computer.

7. The method of claim 6, wherein authenticating includes determining that the remote receiving computer has a particular remote computer number.

8. A method to descramble a bit scrambled video signal in a computer, comprising:
   receiving blocks of the bit scrambled video signal; and
   descrambling the blocks of the bit scrambled video signal responsive to a remote computer number of the computer in which the descrambling is occurring,
   wherein blocks of the digital video signal was scrambled responsive to a key of which
     a remote computer number and
     a video position number are components, the video position number representing positional information including the block to be scrambled,
   wherein the descrambling includes XOR operations between
     the blocks of the digital video signal to be descrambled and
     other operands, with each XOR operation being between
       one of the blocks to be descrambled and
       one of the other operands,
     wherein the other operands are each the key.

9. The method of claim 8, wherein the descrambling is responsive to a key produced by a processing mechanism that receives a key of which the remote computer number is a component.

10. The method of claim 8, wherein for a first block to be descrambled, the other operand is the key, and for subsequent blocks to be descrambled, the other operands are blocks of the digital video signal preceding the block to be descrambled.

11. The method of claim 10, wherein the preceding blocks are immediately preceding blocks with respect to block to be descrambled.

12. The method of claim 9, wherein there are more than one level of XOR operations.

13. The method of claim 8, wherein the remote computer number is a processor number.

14. An article comprising:
a machine readable medium having instructions thereon which when executed by
a computer cause the computer to:
receive blocks of the digital video signal; and
scramble the blocks of the digital video signal responsive to a key of which
a remote computer number and
a video position number are components, the video position number representing positional information including the block to be scrambled, wherein the scrambling includes XOR operations between
the blocks of the digital video signal to be scrambled and
other operands, with each XOR operation being between
one of the blocks to be scrambled and
one of the other operands,
wherein the other operands are each the key.

15. An article comprising:
a machine readable medium having instructions thereon which when executed by
a computer cause the computer to:
receiving blocks of a bit scrambled video signal, the blocks of the digital video signal scrambled responsive to a key of which
a remote computer number and
a video position number are components, the video position number representing positional information including the block to be scrambled, wherein the scrambling includes XOR operations between
the blocks of the digital video signal to be scrambled and
other operands, with each XOR operation being between
one of the blocks to be scrambled and
one of the other operands,
wherein the other operands are each the key; and
descrambling the blocks of the bit scrambled video signal.

16. A computer system comprising:
a scrambling device to
receive blocks of a digital video signal and
scramble the blocks of the digital video signal responsive to a key of which
a remote computer number and
a video position number are components, the video position number representing positional information including the block to be scrambled,
wherein the scrambling includes XOR operations between
the blocks of the digital video signal to be scrambled and
other operands, with each XOR operation being between
one of the blocks to be scrambled and
one of the other operands,
wherein the other operands are each the key.

17. A computer system comprising:
a descrambling device to
receive blocks of a bit scrambled video signal and
descramble the blocks of the bit scrambled video signal responsive to
a remote computer number of the computer system in which the descrambling is occurring and
a video position number,
wherein the descrambling includes XOR operations between
the blocks of the digital video signal to be descrambled and
other operands, with each XOR operation being between
one of the blocks to be descrambled and
one of the other operands,
wherein the other operands are each the key.

18. The computer system of claim 17, further comprising a processing mechanism to receive a key of which the remote computer number is a component and to produce a processed key and wherein the descrambling is response to which the processed key.

* * * * *